United States Patent
Nitta

(10) Patent No.: US 11,061,206 B2
(45) Date of Patent: Jul. 13, 2021

(54) IMAGING LENS

(71) Applicant: KANTATSU CO., LTD., Yaita (JP)

(72) Inventor: Koji Nitta, Tokyo (JP)

(73) Assignee: KANTATSU CO., LTD., Yaita (JP)

( * ) Notice: Subject to any disclaimer, the term of this patent is extended or adjusted under 35 U.S.C. 154(b) by 0 days.

(21) Appl. No.: 16/547,033

(22) Filed: Aug. 21, 2019

(65) Prior Publication Data

US 2020/0249435 A1 Aug. 6, 2020

(30) Foreign Application Priority Data

Aug. 21, 2018 (JP) .............................. JP2018-154545

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2019/0121090 A1* 4/2019 Shi .......................... G02B 9/64

FOREIGN PATENT DOCUMENTS

CN 107037568 A 8/2017

* cited by examiner

*Primary Examiner* — Wen Huang
(74) *Attorney, Agent, or Firm* — Hamre, Schumann, Mueller & Larson, P.C.

(57) ABSTRACT

There is provided an imaging lens with excellent optical characteristics which satisfies demand of wide field of view, low-profileness and low F-number. An imaging lens comprises, in order from an object side to an image side, a first lens with positive refractive power having an object-side surface being convex in a paraxial region, a second lens with negative refractive power in a paraxial region, a third lens, a fourth lens being a double-sided aspheric lens, a fifth lens, a sixth lens having an image-side surface being concave in a paraxial region, and a seventh lens with negative refractive power having an image-side surface being concave in a paraxial region, wherein the image-side surface of the seventh lens is an aspheric surface having at least one pole point in a position off the optical axis, and predetermined conditional expressions are satisfied.

10 Claims, 6 Drawing Sheets

IMAGING LENS

The present application is based on and claims priority of a Japanese patent application No. 2018-154545 filed on Aug. 21, 2018, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in Patent Document 1 below have been known.

Patent Document 1 (CN107037568A) discloses an imaging lens comprising, in order from an object side, a first lens with positive refractive power having a convex object-side surface, a second lens with negative refractive power, a third lens, a fourth lens, a fifth lens, a sixth lens having at least one aspheric surface, and a seventh lens being double-sided aspheric lens.

SUMMARY OF THE INVENTION

However, in lens configurations disclosed in the Patent Document 1, when wide field of view, low-profileness and low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low-profileness and the low F-number in well balance and excellently corrects aberrations.

Regarding terms used in the present invention, "a convex surface", "a concave surface" or "a plane surface" of lens surfaces implies that a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power having an object-side surface being convex in a paraxial region, a second lens with negative refractive power in a paraxial region, a third lens, a fourth lens being a double-sided aspheric lens, a fifth lens, a sixth lens having an image-side surface being concave in a paraxial region, and a seventh lens with negative refractive power having an image-side surface being concave in a paraxial region, wherein the image-side surface of the seventh lens is an aspheric surface having at least one pole point in a position off the optical axis.

According to the imaging lens having the above-described configuration, the first lens properly corrects spherical aberration and distortion by having the object-side surface being convex in the paraxial region. The second lens properly corrects the spherical aberration, chromatic aberration and the distortion. The third lens properly corrects astigmatism and the distortion. The fourth lens properly corrects aberrations at a peripheral area by the aspheric surfaces on both sides. The fifth lens properly corrects field curvature and the distortion. The sixth lens properly corrects coma aberration, the astigmatism, the field curvature and the distortion.

The seventh lens properly corrects the chromatic aberration, the astigmatism, the field curvature and the distortion. Furthermore, an image-side surface of the seventh lens is concave in a paraxial region and is formed as an aspheric surface having at least one pole point in a position off the optical axis. Therefore, the field curvature and the distortion can be properly corrected and a light ray incident angle to an image sensor can be properly controlled.

According to the imaging lens having the above-described configuration, it is preferable that an image-side surface of the first lens is concave in a paraxial region.

When the image-side surface of the first lens is concave in a paraxial region, the astigmatism and the distortion can be properly corrected.

According to the imaging lens having the above-described configuration, it is preferable that an object-side surface of the third lens is convex in a paraxial region.

When the object-side surface of the third lens is convex in a paraxial region, the astigmatism and the distortion can be properly corrected.

According to the imaging lens having the above-described configuration, it is preferable that the third lens is formed in a meniscus shape in a paraxial region.

When the third lens is formed in a meniscus shape in a paraxial region, the astigmatism and the distortion can be properly corrected.

According to the imaging lens having the above-described configuration, it is preferable that the fourth lens has an object-side surface and an image-side surface which are plane in a paraxial region.

When the fourth lens has the object-side surface and the image-side surface which are plane in a paraxial region, the astigmatism, the field curvature and the distortion at the peripheral area can be properly corrected by the aspheric surfaces on both sides without affecting refractive power of the overall optical system of the imaging lens.

According to the imaging lens having the above-described configuration, it is preferable that an image-side surface of the fifth lens is convex in a paraxial region.

When the image-side surface of the fifth lens is convex in a paraxial region, the field curvature and the distortion can be properly corrected.

According to the imaging lens having the above-described configuration, it is preferable that an object-side surface of the seventh lens is convex in a paraxial region.

When the object-side surface of the seventh lens is convex in a paraxial region, the astigmatism and the distortion can be properly corrected.

According to the imaging lens having the above-described configuration, it is preferable that the following conditional expression (1) is satisfied:

$$10.00 < vd2 < 29.00 \tag{1}$$

where vd2: an abbe number at d-ray of the second lens.

The conditional expression (1) defines an appropriate range of the abbe number at d-ray of the second lens. By satisfying the conditional expression (1), the chromatic aberration can be properly corrected.

According to the imaging lens having the above-described configuration, it is preferable that the following conditional expression (2) is satisfied:

$$1.80 < vd3/vd5 < 4.00 \tag{2}$$

where vd3: an abbe number at d-ray of the third lens, and
vd5: an abbe number at d-ray of the fifth lens.

The conditional expression (2) defines an appropriate range of each of the abbe number at d-ray of the third lens and the abbe number at d-ray of the fifth lens. By satisfying the conditional expression (2), the chromatic aberration can be properly corrected.

According to the imaging lens having the above-described configuration, it is preferable that the following conditional expression (3) is satisfied:

$$0.10 < (T5/TTL) \times 100 < 0.40 \tag{3}$$

where

T5: a distance along the optical axis from an image-side surface of the fifth lens to an object-side surface of the sixth lens, and
TTL: a total track length.

The conditional expression (3) defines an appropriate range of a distance along the optical axis between the fifth lens and the sixth lens. By satisfying the conditional expression (3), the coma aberration can be properly corrected.

According to the imaging lens having the above-described configuration, it is preferable that the following conditional expression (4) is satisfied:

$$10.00 < vd4 < 29.00 \tag{4}$$

where vd4: an abbe number at d-ray of the fourth lens.

The conditional expression (4) defines an appropriate range of the abbe number at d-ray of the fourth lens. By satisfying the conditional expression (4), the chromatic aberration can be properly corrected.

According to the imaging lens having the above-described configuration, it is preferable that the following conditional expression (5) is satisfied:

$$0.60 < vd2/vd5 < 1.40 \tag{5}$$

where vd2: an abbe number at d-ray of the second lens, and
vd5: an abbe number at d-ray of the fifth lens.

The conditional expression (5) defines an appropriate range of each of the abbe number at d-ray of the second lens and the abbe number at d-ray of the fifth lens. By satisfying the conditional expression (5), the chromatic aberration can be properly corrected.

According to the imaging lens having the above-described configuration, it is preferable that the following conditional expression (6) is satisfied:

$$0.60 < vd3/vd6 < 1.40 \tag{6}$$

where vd3: an abbe number at d-ray of the third lens, and
vd6: an abbe number at d-ray of the sixth lens.

The conditional expression (6) defines an appropriate range of each of the abbe number at d-ray of the third lens and the abbe number at d-ray of the sixth lens. By satisfying the conditional expression (6), the chromatic aberration can be properly corrected.

According to the imaging lens having the above-described configuration, it is preferable that the following conditional expression (7) is satisfied:

$$-2.30 < (D2/f2) \times 100 < -0.50 \tag{7}$$

where

D2: a thickness along the optical axis of the second lens, and
f2: a focal length of the second lens.

The conditional expression (7) defines an appropriate range of the thickness along the optical axis of the second lens. When a value is below the upper limit of the conditional expression (7), the thickness along the optical axis of the second lens is prevented from being too small, and formability of the lens becomes excellent. On the other hand, when the value is above the lower limit of the conditional expression (7), the thickness along the optical axis of the second lens is suppressed from being too large, and air gaps on the object side and the image side of the second lens can be easily secured. As a result, the low-profileness can be achieved. Furthermore, by satisfying the conditional expression (7), the astigmatism and the distortion can be properly corrected.

According to the imaging lens having the above-described configuration, it is preferable that the following conditional expression (8) is satisfied:

$$0.30 < (D5/|f5|) \times 100 < 6.50 \tag{8}$$

where

D5: a thickness along the optical axis of the fifth lens, and
f5: a focal length of the fifth lens.

The conditional expression (8) defines an appropriate range of the thickness along the optical axis of the fifth lens. When a value is below the upper limit of the conditional expression (8), the thickness along the optical axis of the fifth lens is suppressed from being too large, and air gaps on the object side and the image side of the fifth lens can be easily secured. As a result, the low-profileness can be achieved. On the other hand, when the value is above the lower limit of the conditional expression (8), the thickness along the optical axis of the fifth lens is prevented from being too small, and formability of the lens becomes excellent. Furthermore, by satisfying the conditional expression (8), the astigmatism can be properly corrected.

According to the imaging lens having the above-described configuration, it is preferable that the following conditional expression (9) is satisfied:

$$1.00 < (T3/TTL) \times 100 < 4.00 \tag{9}$$

where

T3: a distance along the optical axis from an image-side surface of the third lens to an object-side surface of the fourth lens, and
TTL: a total track length.

The conditional expression (9) defines an appropriate range of a distance along the optical axis between the third lens and the fourth lens. By satisfying the conditional expression (9), the astigmatism and the distortion can be properly corrected.

According to the imaging lens having the above-described configuration, it is preferable that the following conditional expression (10) is satisfied:

$$0.10<|f3/f5|<2.10 \qquad (10)$$

where
f3: a focal length of the third lens, and
f5: a focal length of the fifth lens.

The conditional expression (10) defines an appropriate range of each of refractive powers of the third lens and the fifth lens. By satisfying the conditional expression (10), the coma aberration, the astigmatism and the distortion can be properly corrected.

According to the imaging lens having the above-described configuration, it is preferable that the following conditional expression (11) is satisfied:

$$1.55<|f3/f7|<12.50 \qquad (11)$$

where
f3: a focal length of the third lens, and
f7: a focal length of the seventh lens.

The conditional expression (11) defines an appropriate range of each of refractive powers of the third lens and the seventh lens. By satisfying the conditional expression (11), the coma aberration, the astigmatism and the distortion can be properly corrected.

According to the imaging lens having the above-described configuration, it is preferable that the following conditional expression (12) is satisfied:

$$0.50<r2/f<2.10 \qquad (12)$$

where
r2: a paraxial curvature radius of an image-side surface of the first lens, and
f: a focal length of the overall optical system of the imaging lens.

The conditional expression (12) defines an appropriate range of the paraxial curvature radius of the image-side surface of the first lens. When a value is below the upper limit of the conditional expression (12), the astigmatism can be properly corrected. On the other hand, when the value is above the lower limit of the conditional expression (12), the spherical aberration can be properly corrected.

According to the imaging lens having the above-described configuration, it is preferable that the following conditional expression (13) is satisfied:

$$-8.50<r10/f<-0.70 \qquad (13)$$

where
r10: a paraxial curvature radius of an image-side surface of the fifth lens, and
f: a focal length of the overall optical system of the imaging lens.

The conditional expression (13) defines an appropriate range of the paraxial curvature radius of the image-side surface of the fifth lens. When a value is below the upper limit of the conditional expression (13), the field curvature can be properly corrected. On the other hand, when the value is above the lower limit of the conditional expression (13), the astigmatism and the distortion can be properly corrected.

According to the imaging lens having the above-described configuration, it is preferable that the following conditional expression (14) is satisfied:

$$0.30<r13/f<1.55 \qquad (14)$$

where
r13: a paraxial curvature radius of an object-side surface of the seventh lens, and f: a focal length of the overall optical system of the imaging lens.

The conditional expression (14) defines an appropriate range of the paraxial curvature radius of the object-side surface of the seventh lens. When a value is below the upper limit of the conditional expression (14), the field curvature can be properly corrected. On the other hand, when the value is above the lower limit of the conditional expression (14), the astigmatism and the distortion can be properly corrected.

According to the imaging lens having the above-described configuration, it is preferable that the following conditional expression (15) is satisfied:

$$1.15<r5/f<6.70 \qquad (15)$$

where
r5: a paraxial curvature radius of an object-side surface of the third lens, and
f: a focal length of the overall optical system of the imaging lens.

The conditional expression (15) defines an appropriate range of the paraxial curvature radius of the object-side surface of the third lens. By satisfying the conditional expression (15), the astigmatism and the distortion can be properly corrected.

According to the imaging lens having the above-described configuration, it is preferable that the following conditional expression (16) is satisfied:

$$0.15<r14/f<0.55 \qquad (16)$$

where
r14: a paraxial curvature radius of an image-side surface of the seventh lens, and
f: a focal length of the overall optical system of the imaging lens.

The conditional expression (16) defines an appropriate range of the paraxial curvature radius of the image-side surface of the seventh lens. By satisfying the conditional expression (16), the astigmatism, the field curvature and the distortion can be properly corrected.

According to the imaging lens having the above-described configuration, it is preferable that the third lens and the fourth lens have positive composite refractive power in a paraxial region, and more preferable that the following conditional expression (17) is satisfied:

$$2.50<f34/f<14.00 \qquad (17)$$

where
f34: a composite focal length of the third lens and the fourth lens, and
f: the focal length of the overall optical system of the imaging lens.

When the composite refractive power of the third lens and the fourth lens is positive, it is favorable for reducing a profile. The conditional expression (17) defines an appropriate range of the composite refractive power of the third lens and the fourth lens. When a value is below the upper limit of the conditional expression (17), the positive composite refractive power of the third lens and the fourth lens becomes appropriate, and the low-profileness can be achieved. On the other hand, when the value is above the lower limit of the conditional expression (17), the astigmatism, the field curvature and the distortion can be properly corrected.

According to the imaging lens having the above-described configuration, it is preferable that the following conditional expression (18) is satisfied:

$$0.50<(D3/f3)\times100<4.50 \qquad (18)$$

where

D3: a thickness along the optical axis of the third lens, and f3: a focal length of the third lens.

The conditional expression (18) defines an appropriate range of the thickness along the optical axis of the third lens. When a value is below the upper limit of the conditional expression (18), the thickness along the optical axis of the third lens is suppressed from being too large, and air gaps on the object side and the image side of the third lens can be easily secured. As a result, the low-profileness can be realized. On the other hand, when the value is above the lower limit of the conditional expression (18), the thickness along the optical axis of the third lens is prevented from being too small, and the formability of the lens becomes excellent. Furthermore, by satisfying the conditional expression (18), the astigmatism and the distortion can be properly corrected.

According to the imaging lens having the above-described configuration, it is preferable that the following conditional expression (19) is satisfied:

$$TTL/EPd \leq 2.10 \qquad (19)$$

where

EPd: an entrance pupil diameter, and

TTL: a total track length.

The conditional expression (19) defines relationship between the total track length and the entrance pupil diameter. By satisfying the conditional expression (19), the total track length can be shortened, decrease in light quantity at the peripheral area can be suppressed and an image having sufficient brightness from a center to a peripheral area can be obtained.

Effect of Invention

According to the present invention, there can be provided an imaging lens with high resolution which satisfies demand of the wide field of view, the low-profileness and the low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5, 7, 9 and 11 are schematic views of the imaging lenses in Examples 1 to 6 according to the embodiments of the present invention, respectively.

Figure 1:
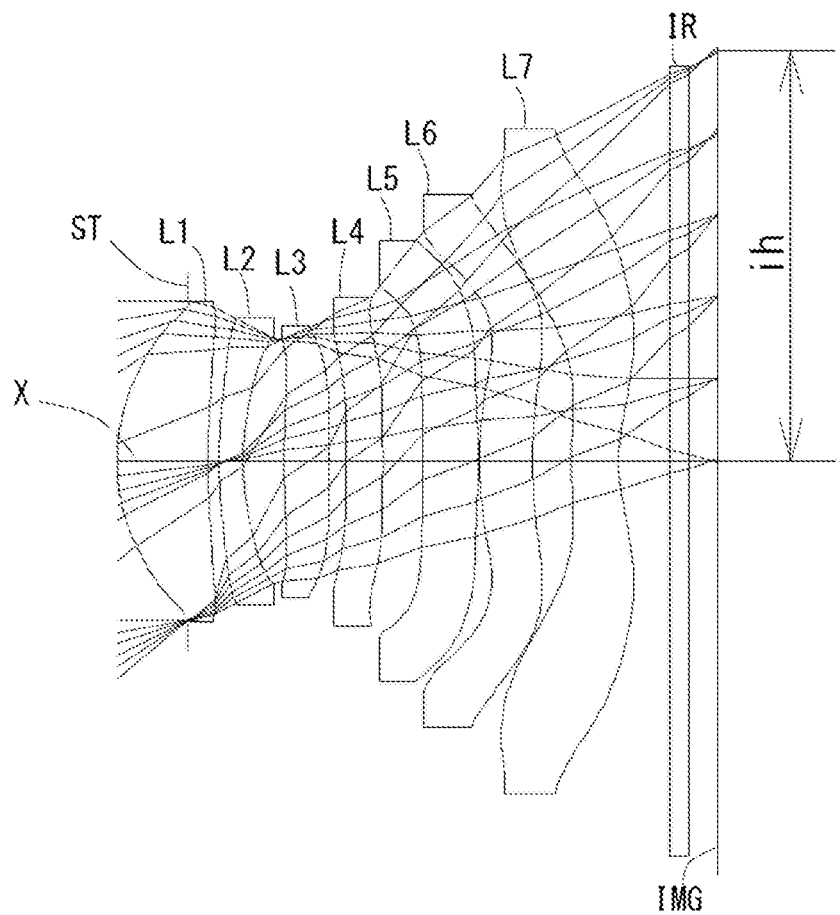
FIG. 1 is a schematic view showing an imaging lens in Example 1 according to the present invention.

As shown in FIG. 1, the imaging lens according to the present embodiment comprises, in order from an object side to an image side, a first lens L1 with positive refractive power having an object-side surface being convex in a paraxial region (near the optical axis X), a second lens L2 with negative refractive power in a paraxial region (near the optical axis X), a third lens L3, a fourth lens L4 being a double-sided aspheric lens, a fifth lens L5, a sixth lens L6 having an image-side surface being concave in a paraxial region (near the optical axis X), and a seventh lens L7 with negative refractive power having an image-side surface being concave in a paraxial region (near the optical axis X), wherein the image-side surface of the seventh lens L7 is an aspheric surface having at least one pole point in a position off the optical axis X.

A filter IR such as an IR cut filter and a cover glass are arranged between the seventh lens L7 and an image plane IMG (namely, the image plane of an image sensor). The filter IR is omissible.

By arranging an aperture stop ST on the object side of the first lens L1, correction of aberrations and control of an incident angle of the light ray of high image height to an image sensor become facilitated.

The first lens L1 has the positive refractive power and is formed in a meniscus shape having an object-side surface being convex and an image-side surface being concave in a paraxial region (near the optical axis X). Therefore, spherical aberration, astigmatism and distortion can be properly corrected.

The second lens L2 has the negative refractive power and is formed in a meniscus shape having an object-side surface being convex and an image-side surface being concave in a paraxial region (near the optical axis X). Therefore, the spherical aberration, chromatic aberration, the astigmatism and the distortion can be properly corrected.

The third lens L3 has positive refractive power and is formed in a meniscus shape having an object-side surface being convex and an image-side surface being concave in a paraxial region (near the optical axis X). Therefore, the astigmatism and the distortion can be properly corrected.

Figure 3:
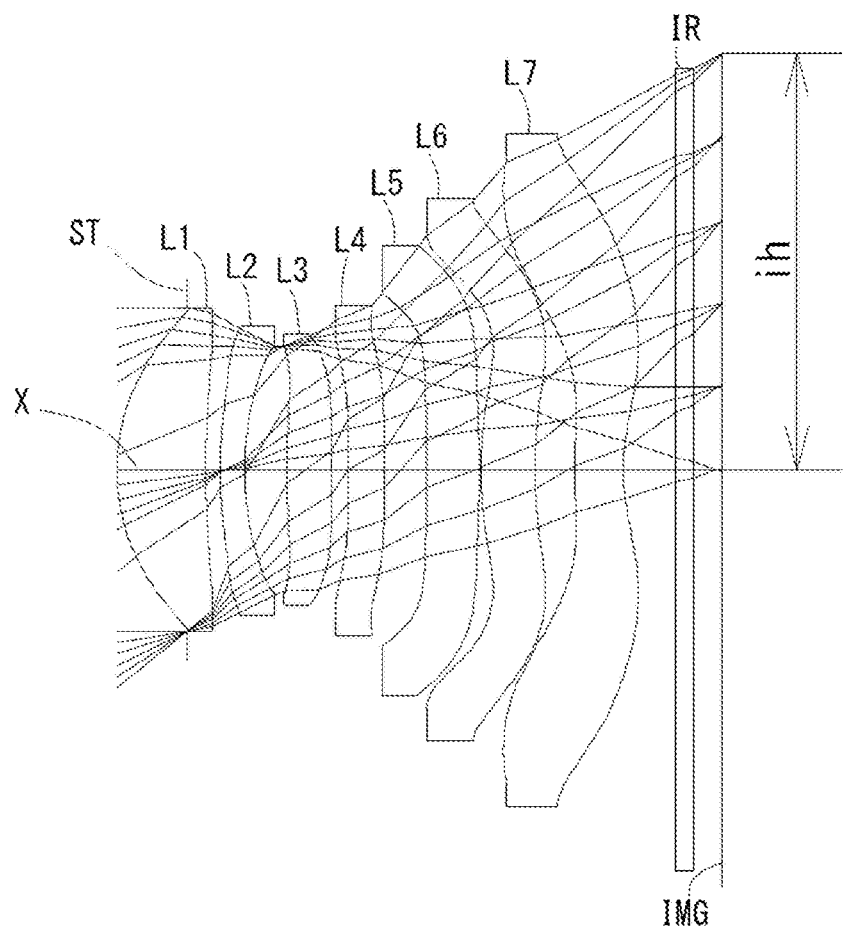
FIG. 3 is a schematic view showing an imaging lens in Example 2 according to the present invention.
Figure 5:
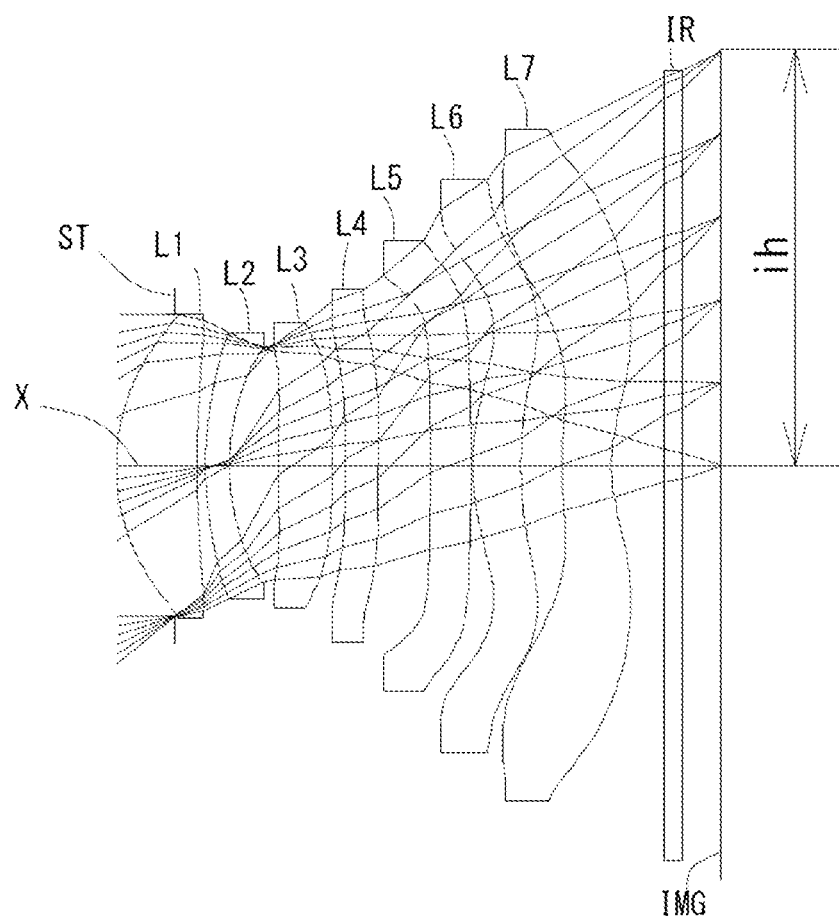
FIG. 5 is a schematic view showing an imaging lens in Example 3 according to the present invention.
Figure 7:
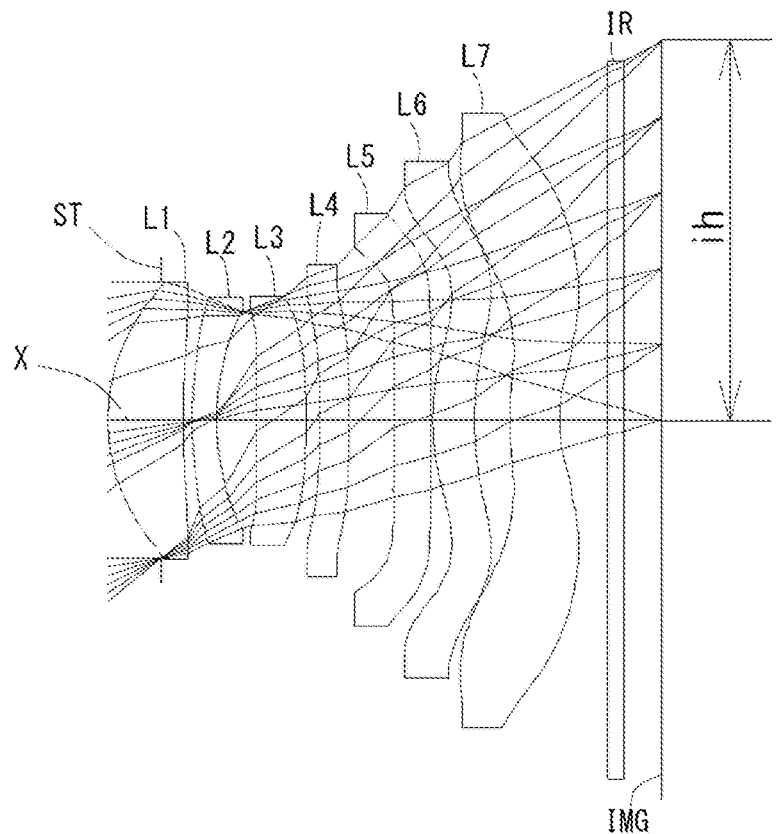
FIG. 7 is a schematic view showing an imaging lens in Example 4 according to the present invention.

The third lens L3 may be formed in a biconvex shape having the object-side surface being convex and the image-side surface being convex in a paraxial region (near the optical axis X) as in the Examples 2, 3 and 4 shown in FIGS. 3, 5 and 7. In this case, the positive refractive power on the both sides are favorable for reducing a profile. Furthermore, when the both-side surfaces are convex, a curvature is suppressed from being large, and sensitivity to a manufacturing error can be reduced.

The fourth lens L4 is formed in a shape having an object-side surface and an image-side surface which are plane in a paraxial region (near the optical axis X), and substantially has no refractive power in a paraxial region. Therefore, the astigmatism, the field curvature and the distortion at a peripheral area can be properly corrected by aspheric surfaces on both sides without affecting refractive power of the overall optical system of the imaging lens.

The fifth lens L5 has positive refractive power and is formed in a meniscus shape having an object-side surface being concave and an image-side surface being convex in a paraxial region (near the optical axis X). Therefore, a light ray incident angle to the fifth lens L5 becomes appropriate, and the astigmatism, field curvature and the distortion can be properly corrected.

The fifth lens L5 may have negative refractive power as in the Examples 3 and 4 shown in FIGS. 5 and 7. In this case, it is favorable for correcting the chromatic aberration. Furthermore, a shape of the fifth lens L5 may be a biconvex shape having the object-side surface being convex and the image-side surface being convex in a paraxial region (near the optical axis X) as in the Examples 5 and 6 shown in FIGS. 9 and 11. In this case, the positive refractive power on both sides are favorable for reducing the profile. When the both-side surfaces are convex, a curvature is suppressed from being large, and sensitivity to a manufacturing error can be reduced.

The sixth lens L6 has negative refractive power and is formed in a meniscus shape having an object-side surface being convex and an image-side surface being concave in a paraxial region (near the optical axis X). Therefore, coma aberration, the astigmatism, the field curvature and the distortion can be properly corrected.

The sixth lens L6 may have positive refractive power as in the Examples 3, 4, 5 and 6 shown in FIGS. 5, 7, 9 and 11. In this case, it is favorable for reducing the profile.

Furthermore, the object-side surface and the image-side surface of the sixth lens L6 are formed as aspheric surfaces having at least one pole point in a position off the optical axis X. Therefore, the field curvature and the distortion can be properly corrected.

The seventh lens L7 has negative refractive power and is formed in a meniscus shape having an object-side surface being convex and the image-side surface being concave in a paraxial region (near the optical axis X). Therefore, the chromatic aberration, the astigmatism, the field curvature and the distortion can be properly corrected.

Furthermore, the object-side surface and the image-side surface of the seventh lens L7 are formed as aspheric surfaces having at least one pole point in a position off the optical axis X. Therefore, the field curvature and the distortion can be properly corrected, and a light ray incident angle to the image sensor can be appropriately controlled.

Regarding the imaging lens according to the present embodiments, it is preferable that all lenses of the first lens L1 to the seventh lens L7 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with the case in which a cemented lens is used, workload is reduced, and manufacturing in low cost becomes possible.

Furthermore, the imaging lens according to the present embodiments makes manufacturing facilitated by using a plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (19).

$$10.00 < vd2 < 29.00 \tag{1}$$

$$1.80 < vd3/vd5 < 4.00 \tag{2}$$

$$0.10 < (T5/TTL) \times 100 < 0.40 \tag{3}$$

$$10.00 < vd4 < 29.00 \tag{4}$$

$$0.60 < vd2/vd5 < 1.40 \tag{5}$$

$$0.60 < vd3/vd6 < 1.40 \tag{6}$$

$$-2.30 < (D2/f2) \times 100 < -0.50 \tag{7}$$

$$0.30 < (D5/|f5|) \times 100 < 6.50 \tag{8}$$

$$1.00 < (T3/TTL) \times 100 < 4.00 \tag{9}$$

$$0.10 < |f3/f5| < 2.10 \tag{10}$$

$$1.55 < |f3/f7| < 12.50 \tag{11}$$

$$0.50 < r2/f < 2.10 \tag{12}$$

$$-8.50 < r10/f < -0.70 \tag{13}$$

$$0.30 < r13/f < 1.55 \tag{14}$$

$$1.15 < r5/f < 6.70 \tag{15}$$

$$0.15 < r14/f < 0.55 \tag{16}$$

$$2.50 < f34/f < 14.00 \tag{17}$$

$$0.50 < (D3/f3) \times 100 < 4.50 \tag{18}$$

$$TTL/EPd \leq 2.10$$

where
vd2: an abbe number at d-ray of the second lens L2,
vd3: an abbe number at d-ray of the third lens L3,
vd4: an abbe number at d-ray of the fourth lens L4,
vd5: an abbe number at d-ray of the fifth lens L5,
vd6: an abbe number at d-ray of the sixth lens L6,
D2: a thickness along the optical axis X of the second lens L2,
D3: a thickness along the optical axis X of the third lens L3,
D5: a thickness along the optical axis X of the fifth lens L5,
T3: a distance along the optical axis X from an image-side surface of the third lens L3 to an object-side surface of the fourth lens L4,
T5: a distance along the optical axis X from an image-side surface of the fifth lens L5 to an object-side surface of the sixth lens L6,
TTL: a total track length,
EPd: an entrance pupil diameter,
f: a focal length of the overall optical system of the imaging lens,
f2: a focal length of the second lens L2,
f3: a focal length of the third lens L3,
f5: a focal length of the fifth lens L5,
f7: a focal length of the seventh lens L7, f34: a composite focal length of the third lens L3 and the fourth lens L4, r2: a paraxial curvature radius of an image-side surface of the first lens L1, r5: a paraxial curvature radius of an object-side surface of the third lens L3, r10: a paraxial curvature radius of an image-side surface of the fifth lens L5, r13: a paraxial curvature radius of an object-side surface of the seventh lens L7, and r14: a paraxial curvature radius of an image-side surface of the seventh lens L7.

It is not necessary to satisfy the above all conditional expressions, and by satisfying the conditional expression individually, operational advantage corresponding to each conditional expression can be obtained.

The imaging lens according to the present embodiments shows further preferable effect by satisfying the following conditional expressions (1a) to (19a).

$15.00 < vd2 < 24.00$ (1a)

$2.30 < vd3/vd5 < 3.40$ (2a)

$0.16 < (T5/TTL) \times 100 < 0.30$ (3a)

$14.50 < vd4 < 24.50$ (4a)

$0.80 < vd2/vd5 < 1.20$ (5a)

$0.80 < vd3/vd6 < 1.20$ (6a)

$-2.10 < (D2/f2) \times 100 < -0.70$ (7a)

$0.40 < (D5/|f5|) \times 100 < 5.50$ (8a)

$1.35 < (T3/TTL) \times 100 < 3.50$ (9a)

$0.20 < |f3/f5| < 1.75$ (10a)

$2.20 < |f3/f7| < 10.50$ (11a)

$0.80 < r2/f < 1.70$ (12a)

$-7.00 < r10/f < -0.85$ (13a)

$0.45 < r13/f < 1.25$ (14a)

$1.40 < r5/f < 5.90$ (15a)

$0.20 < r14/f < 0.45$ (16a)

$3.00 < f34/f < 12.50$ (17a)

$0.80 < (D3/f3) \times 100 < 3.50$ (18a)

$TTL/EPd \leq 2.00$ (19a)

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$ [Equation 1]

Next, examples of the imaging lens according to this embodiment will be explained. In each example, f denotes the focal length of the overall optical system of the imaging lens, Fno denotes an F-number, ω denotes a half field of view, ih denotes a maximum image height, and TTL denotes a total track length. Additionally, i denotes surface number counted from, the object side, r denotes the paraxial curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example1 |
|---|

| Unit mm |
|---| f = 5.60
Fno = 1.50
ω(°) = 38.9
ih = 4.60
TTL = 6.64

| Surface Data | | | | |
|---|---|---|---|---|
| i | r | d | Nd | vd |
| (Object) | Infinity | Infinity | | |
| 1(Stop) | Infinity | −0.7981 | | |
| 2* | 2.2531 | 1.0182 | 1.544 | 55.88 (vd1) |
| 3* | 7.8504 | 0.1236 | | |
| 4* | 4.4668 | 0.2700 | 1.671 | 19.48 (vd2) |
| 5* | 3.0043 | 0.4569 | | |
| 6* | 9.2344 | 0.4975 | 1.535 | 55.66 (vd3) |
| 7* | 84.4876 | 0.1950 | | |
| 8* | Infinity | 0.4138 | 1.544 | 55.86 (vd4) |

TABLE 1-continued

Example1

| | | | | |
|---|---|---|---|---|
| 9* | Infinity | 0.4501 | | |
| 10* | −14.3125 | 0.5170 | 1.671 | 19.48 (vd5) |
| 11* | −5.8088 | 0.0150 | | |
| 12* | 6.1282 | 0.5891 | 1.544 | 55.86 (vd6) |
| 13* | 5.1113 | 0.4379 | | |
| 14* | 5.5306 | 0.5276 | 1.535 | 55.66 (vd7) |
| 15* | 2.0364 | 0.5756 | | |
| 18 | Infinity | 0.2100 | 1.517 | 84.20 |
| 19 | Infinity | 0.3167 | | |
| Image Plane | | | | |

Constituent Lens Data

| Lens | Start Surface | Focal Length | Composite Focal Length | | Entrance pupil diameter | |
|---|---|---|---|---|---|---|
| 1 | 2 | 5.456 | f34 | 19.341 | EPd | 3.735 |
| 2 | 4 | −14.752 | | | | |
| 3 | 6 | 19.341 | | | | |
| 4 | 8 | Infinity | | | | |
| 5 | 10 | 14.150 | | | | |
| 6 | 12 | −71.113 | | | | |
| 7 | 14 | −6.352 | | | | |

Aspheric Surface Data

| | Second Surface | Third Surface | Fourth Surface | Fifth Surface | Sixth Surface | Seventh Surface | Eighth Surface |
|---|---|---|---|---|---|---|---|
| k | 0.000000E+00 | 0.000000E+00 | 0.000000E+00 | 0.000000E+00 | 0.000000E+00 | −6.443085E+01 | −1.000000E+00 |
| A4 | −4.367540E−03 | −3.974717E−02 | −8.997080E−02 | −5.190028E−02 | −7.265314E−03 | −4.531455E−02 | −6.400356E−02 |
| A6 | 1.393044E−02 | 2.514025E−02 | 7.831744E−02 | 2.509284E−02 | −6.885583E−02 | 5.573786E−02 | 5.790909E−02 |
| A8 | −2.243510E−02 | −6.520461E−03 | −7.213236E−02 | 6.556548E−02 | 2.207184E−01 | −1.473832E−01 | −1.355172E−01 |
| A10 | 2.082981E−02 | 2.705888E−04 | 8.804490E−02 | −1.909733E−01 | −4.531016E−01 | 2.148535E−01 | 2.107113E−01 |
| A12 | −1.149797E−02 | −2.920434E−03 | −8.787910E−02 | 2.824872E−01 | 5.689747E−01 | −2.004551E−01 | −2.019367E−01 |
| A14 | 3.699396E−03 | 3.682821E−03 | 5.656202E−02 | −2.535224E−01 | −4.480192E−01 | 1.160023E−01 | 1.194048E−01 |
| A16 | −8.442012E−04 | −1.805583E−03 | −2.170167E−02 | 1.369872E−01 | 2.144818E−01 | −3.976641E−02 | −4.151239E−02 |
| A18 | 4.824105E−05 | 4.088739E−04 | 4.519771E−03 | −4.078733E−02 | −5.899746E−02 | 7.408914E−03 | 7.746142E−03 |
| A20 | −7.320725E−07 | −3.579640E−05 | −3.919532E−04 | 5.146835E−03 | 8.456665E−03 | −5.816295E−04 | −5.993402E−04 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −1.000000E+00 | 0.000000E+00 | −4.800721E+01 | 1.153285E+00 | 0.000000E+00 | −1.450000E+01 | −7.054468E+00 |
| A4 | −4.686552E−02 | 1.293943E−02 | 8.747313E−02 | 9.994894E−02 | −1.483940E−02 | −1.208908E−01 | −6.545877E−02 |
| A6 | 3.577610E−02 | 4.235401E−02 | −7.976449E−02 | −1.451254E−01 | 1.234993E−03 | 3.342073E−02 | 1.930303E−02 |
| A8 | −6.794288E−02 | −8.869944E−02 | 3.538552E−02 | 9.888735E−02 | −6.438771E−03 | −5.857013E−03 | −4.989518E−03 |
| A10 | 7.860626E−02 | 7.295393E−02 | −1.016424E−02 | −4.841219E−02 | 3.205413E−03 | 8.817940E−04 | 1.068142E−03 |
| A12 | −5.129563E−02 | −3.472619E−02 | 1.965641E−03 | 1.613867E−02 | −8.382609E−04 | −1.079357E−04 | −1.605566E−04 |
| A14 | 2.162367E−02 | 9.791381E−03 | −2.558174E−04 | −3.490781E−03 | 1.356720E−04 | 9.394701E−06 | 1.538260E−05 |
| A16 | −5.556509E−03 | −1.519398E−03 | 1.813316E−05 | 4.635300E−04 | −1.337151E−05 | −5.216867E−07 | −8.873892E−07 |
| A18 | 7.989104E−04 | 9.632253E−05 | −3.704225E−07 | −3.403589E−05 | 7.268159E−07 | 1.643062E−08 | 2.814583E−08 |
| A20 | −4.917261E−05 | 8.042248E−07 | −2.760184E−08 | 1.052509E−06 | −1.657857E−08 | −2.235181E−10 | −3.782425E−10 |

The imaging lens in Example 1 satisfies conditional expressions (1) to (19) as shown in Table 7.

Figure 2:
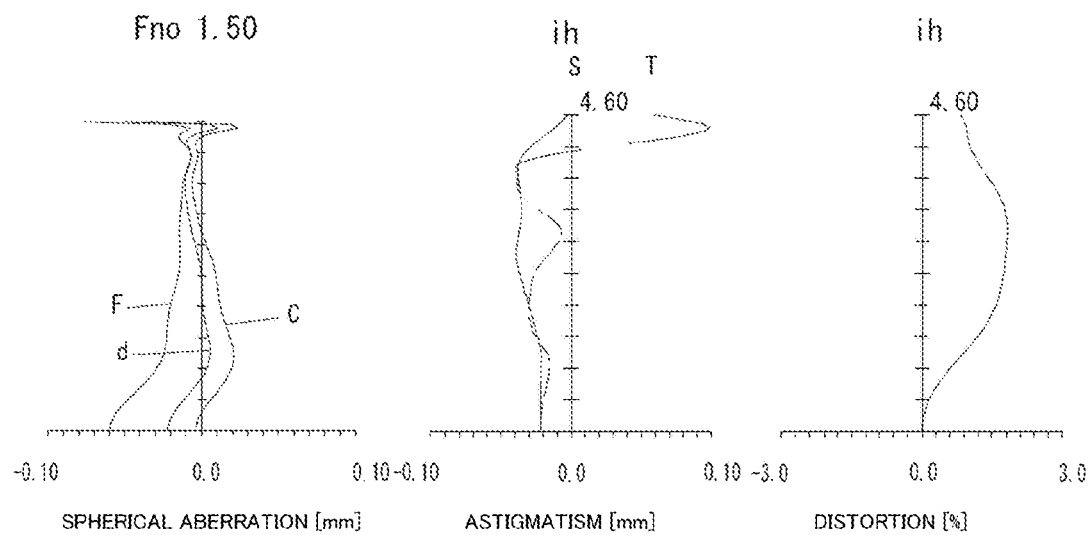
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8, 10 and 12). As shown in FIG. 2, each aberration is corrected excellently.

Example 2

The basic lens data is shown below in Table 2.

TABLE 2

Example2

Unit mm f = 5.60
Fno = 1.50
ω(°) = 38.8
ih = 4.60
TTL = 6.63

TABLE 2-continued

Example2

Surface Data

| i | r | d | Nd | vd |
|---|---|---|---|---|
| (Object) | Infinity | Infinity | | |
| 1(Stop) | Infinity | −0.7698 | | |
| 2* | 2.2760 | 0.9826 | 1.544 | 55.86 (vd1) |
| 3* | 7.5250 | 0.1602 | | |
| 4* | 4.0813 | 0.2700 | 1.671 | 19.48 (vd2) |
| 5* | 2.9369 | 0.4713 | | |
| 6* | 10.5356 | 0.4972 | 1.535 | 55.68 (vd3) |
| 7* | −1427.7550 | 0.1831 | | |
| 8* | Infinity | 0.4000 | 1.671 | 19.48 (vd4) |
| 9* | Infinity | 0.4741 | | |
| 10* | −13.4127 | 0.5806 | 1.671 | 19.48 (vd5) |
| 11* | −5.8934 | 0.0150 | | |
| 12* | 6.0603 | 0.5010 | 1.544 | 55.86 (vd6) |
| 13* | 5.1877 | 0.4345 | | |
| 14* | 5.6973 | 0.5390 | 1.535 | 55.66 (vd7) |
| 15* | 2.0279 | 0.5756 | | |
| 18 | Infinity | 0.2100 | 1.517 | 54.20 |
| 19 | Infinity | 0.3116 | | |
| Image Plane | | | | |

Constituent Lens Data

| Lens | Start Surface | Focal Length | Composite Focal Length | | Entrance pupil diameter | |
|---|---|---|---|---|---|---|
| 1 | 2 | 5.624 | f34 | 19.558 | EPd | 3.734 |
| 2 | 4 | −17.234 | | | | |
| 3 | 6 | 19.558 | | | | |
| 4 | 8 | Infinity | | | | |
| 5 | 10 | 15.187 | | | | |
| 6 | 12 | −87.423 | | | | |
| 7 | 14 | −6.205 | | | | |

Aspheric Surface Data

| | Second Surface | Third Surface | Fourth Surface | Fifth Surface | Sixth Surface | Seventh Surface | Eighth Surface |
|---|---|---|---|---|---|---|---|
| k | 0.000000E+00 | 0.000000E+00 | 0.000000E+00 | 0.000000E+00 | 0.000000E+00 | −6.443085E+01 | 0.000000E+00 |
| A4 | −1.479570E−03 | −3.716529E−02 | −8.068441E−02 | −3.993785E−02 | −9.225216E−00 | −5.787148E−02 | −8.059018E−02 |
| A6 | 4.803357E−03 | 3.333594E−02 | 6.637939E−02 | −2.925483E−02 | −5.506621E−02 | 7.707867E−02 | 9.750335E−02 |
| A8 | −9.824261E−03 | −3.324379E−02 | −7.344070E−02 | 2.017549E−01 | 1.905866E−01 | −1.631984E−01 | −1.879075E−01 |
| A10 | 1.083384E−02 | 3.180609E−02 | 1.012887E−01 | −4.201595E−01 | −4.111064E−01 | 2.095499E−01 | 2.558189E−01 |
| A12 | −7.170524E−03 | −2.342968E−02 | −1.012247E−01 | 5.337556E−01 | 5.304060E−01 | −1.759530E−01 | −2.226241E−01 |
| A14 | 2.869980E−03 | 1.154267E−02 | 6.381358E−02 | −4.291355E−01 | −4.249849E−01 | 9.179297E−02 | 1.214275E−01 |
| A16 | −6.896533E−04 | −3.534606E−03 | −2.409708E−02 | 2.123730E−01 | 2.058797E−01 | −2.803506E−02 | −3.949215E−02 |
| A18 | 9.171359E−05 | 6.046082E−04 | 4.986283E−03 | −5.891170E−02 | −5.521946E−02 | 4.547200E−03 | 6.969036E−03 |
| A20 | −5.514305E−06 | −4.410846E−05 | −4.339966E−04 | 7.020974E−03 | 6.316130E−03 | −2.999628E−04 | −5.140519E−04 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | 0.000000E+00 | 0.000000E+00 | −4.798392E+01 | 1.339695E+00 | 0.000000E+00 | −1.400000E+01 | −7.255015E+00 |
| A4 | −5.251721E−02 | 1.294752E−02 | 9.636233E−02 | 1.137084E−01 | −3.293360E−03 | −1.218901E−01 | −6.616273E−02 |
| A6 | 3.810499E−02 | 4.594311E−02 | −9.765239E−02 | −1.789041E−01 | −1.538280E−02 | 3.444754E−02 | 1.928272E−02 |
| A8 | −5.385869E−02 | −9.226446E−02 | 5.714307E−02 | 1.278926E−01 | 4.062472E−03 | −6.410498E−03 | −4.707460E−03 |
| A10 | 5.133618E−02 | 7.614357E−02 | −2.532003E−02 | −6.335983E−02 | −6.318529E−04 | 1.042025E−03 | 9.399688E−04 |
| A12 | −2.917635E−02 | −3.819357E−02 | 8.370375E−03 | 2.085741E−02 | 4.160392E−05 | −1.382047E−04 | −1.342127E−04 |
| A14 | 1.001606E−02 | 1.220868E−02 | −1.935078E−03 | −4.404900E−03 | 7.891123E−06 | 1.292080E−05 | 1.244055E−05 |
| A16 | −1.944011E−03 | −2.448640E−03 | 2.859631E−04 | 5.682188E−04 | −2.045976E−06 | −7.681241E−07 | −7.041151E−07 |
| A18 | 1.874418E−04 | 2.778323E−04 | −2.384180E−05 | −4.048407E−05 | 1.717852E−07 | 2.592077E−08 | 2.219894E−08 |
| A20 | −6.518811E−06 | −1.320290E−05 | 8.466600E−07 | 1.215801E−06 | −5.118605E−09 | −3.787567E−10 | −3.006490E−10 |

The imaging lens in Example 2 satisfies conditional expressions (1) to (19) as shown in Table 7.

Figure 4:
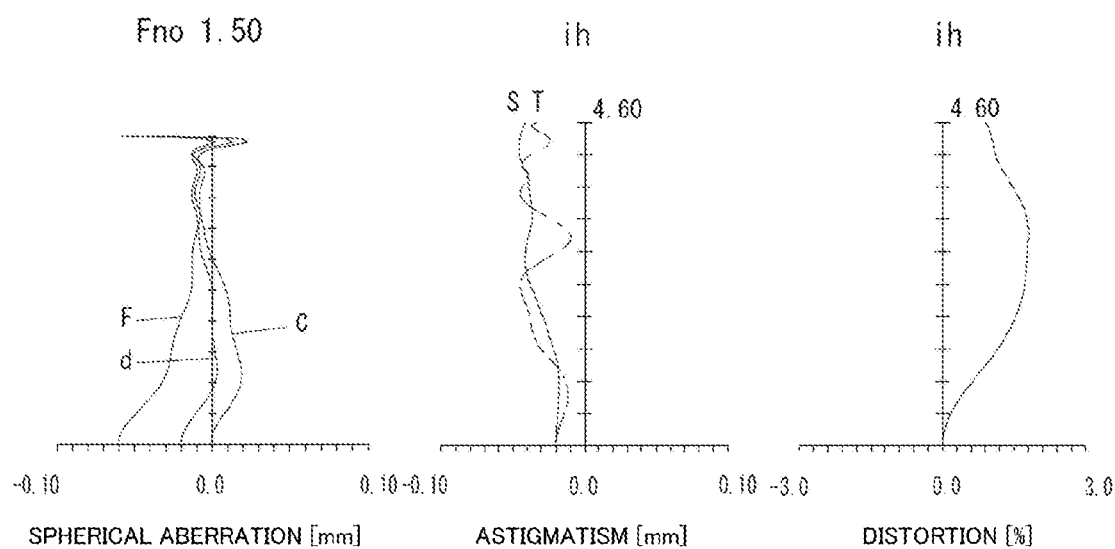
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example3

Unit mm $f = 5.57$
$Fno = 1.60$
$\omega(°) = 39.0$
$ih = 4.60$
$TTL = 6.63$

Surface Data

| i | r | d | Nd | vd |
|---|---|---|----|-----|
| (Object) | Infinity | Infinity | | |
| 1(Stop) | Infinity | −0.6472 | | |
| 2* | 2.2747 | 0.8900 | 1.544 | 55.88 (vd1) |
| 3* | 6.9232 | 0.0932 | | |
| 4* | 3.0252 | 0.2700 | 1.671 | 19.48 (vd2) |
| 5* | 2.3462 | 0.5418 | | |
| 6* | 27.1497 | 0.5969 | 1.535 | 55.66 (vd3) |
| 7* | −20.1436 | 0.1483 | | |
| 8* | Infinity | 0.3688 | 1.671 | 19.48 (vd4) |
| 9* | Infinity | 0.5800 | | |
| 10* | −10.4391 | 0.4500 | 1.671 | 19.48 (vd5) |
| 11* | −13.1346 | 0.0150 | | |
| 12* | 3.0915 | 0.5312 | 1.544 | 55.86 (vd6) |
| 13* | 5.6215 | 0.4525 | | |
| 14* | 3.5935 | 0.5501 | 1.535 | 55.66 (vd7) |
| 15* | 1.6820 | 0.5756 | | |
| 18 | Infinity | 0.2100 | 1.517 | 54.20 |
| 19 | Infinity | 0.4268 | | |
| Image Plane | | | | |

Constituent Lens Data

| Lens | Start Surface | Focal Length | Composite Focal Length | | Entrance pupil diameter | |
|------|--------------|--------------|------------------------|--|--------------------------|--|
| 1 | 2 | 5.831 | f34 | 21.718 | EPd | 3.480 |
| 2 | 4 | −18.526 | | | | |
| 3 | 6 | 21.718 | | | | |
| 4 | 8 | Infinity | | | | |
| 5 | 10 | −81.213 | | | | |
| 6 | 12 | 11.750 | | | | |
| 7 | 14 | −6.419 | | | | |

Aspheric Surface Data

| | Second Surface | Third Surface | Fourth Surface | Fifth Surface | Sixth Surface | Seventh Surface | Eighth Surface |
|---|---|---|---|---|---|---|---|
| k | 0.000000E+00 | 0.000000E+00 | 0.000000E+00 | 0.000000E+00 | 0.000000E+00 | 0.000000E+00 | −1.000000E+00 |
| A4 | −7.054604E−03 | −6.298515E−02 | −1.043938E−01 | −3.867368E−02 | 1.298295E−02 | −6.469153E−02 | −7.894430E−02 |
| A6 | 2.807004E−02 | 5.762155E−02 | 9.095910E−02 | −3.398699E−02 | −1.972043E−01 | 6.505569E−02 | 8.426743E−02 |
| A8 | −6.089929E−02 | −2.215031E−02 | −6.760046E−02 | 1.893350E−01 | 6.270008E−01 | −1.233021E−01 | −1.493487E−01 |
| A10 | 7.745134E−02 | −1.227615E−02 | 6.988892E−02 | −3.221978E−01 | −1.215355E+00 | 1.537755E−01 | 1.862944E−01 |
| A12 | −6.158931E−02 | 2.122712E−02 | −7.429624E−02 | 3.309200E−01 | 1.475652E+00 | −1.119775E−01 | −1.548126E−01 |
| A14 | 3.084856E−02 | −1.271855E−02 | 5.458074E−02 | −2.168383E−01 | −1.134784E+00 | 4.394895E−02 | 7.340315E−02 |
| A16 | −9.491460E−03 | 4.040595E−03 | −2.407215E−02 | 8.953511E−02 | 5.364557E−01 | −7.401226E−03 | −2.051973E−02 |
| A18 | 1.641318E−03 | −6.767440E−04 | 5.756268E−03 | −2.138379E−02 | −1.422874E−01 | −1.838203E−04 | 3.120139E−03 |
| A20 | −1.229721E−04 | 4.664575E−05 | −5.760383E−04 | 2.284517E−03 | 1.623608E−02 | 1.521921E−04 | −1.994003E−04 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −1.000000E+00 | 0.000000E+00 | 0.000000E+00 | −6.758338E−01 | 0.000000E+00 | −1.390000E+01 | −5.542509E+00 |
| A4 | −5.101993E−02 | 1.641143E−02 | 2.604186E−03 | 2.717924E−02 | 7.201532E−02 | −1.128539E−01 | −7.668962E−02 |
| A6 | 5.475657E−02 | 4.135684E−02 | 2.785630E−02 | −5.618617E−02 | −7.088798E−02 | 4.041896E−02 | 2.903727E−02 |
| A8 | −8.602641E−02 | −5.487630E−02 | −2.706352E−02 | 2.466286E−02 | 2.797158E−02 | −1.219101E−02 | −9.402738E−03 |
| A10 | 8.816247E−02 | 3.140474E−02 | 1.241998E−02 | −6.912536E−03 | −7.206459E−03 | 2.865802E−03 | 2.293357E−03 |
| A12 | −5.468971E−02 | −1.115915E−02 | −3.537292E−03 | 1.241992E−03 | 1.207949E−03 | −4.488244E−04 | −3.765518E−04 |

TABLE 3-continued

| | | | Example3 | | | | |
|---|---|---|---|---|---|---|---|
| A14 | 2.074135E−02 | 2.608390E−03 | 6.340663E−04 | −1.398841E−04 | −1.251662E−04 | 4.483359E−05 | 3.950262E−05 |
| A16 | −4.708876E−03 | −4.128323E−04 | −6.895568E−05 | 9.964488E−06 | 7.561190E−06 | −2.783660E−06 | −2.531163E−06 |
| A18 | 5.914836E−04 | 4.074587E−05 | 4.135877E−06 | −4.377155E−07 | −2.376997E−07 | 9.635911E−08 | 9.016794E−08 |
| A20 | −3.184344E−05 | −1.791414E−06 | −1.027388E−07 | 9.422799E−09 | 2.857182E−09 | −1.459945E−09 | −1.366784E−09 |

The imaging lens in Example 3 satisfies conditional expressions (1) to (19) as shown in Table 7.

Figure 6:
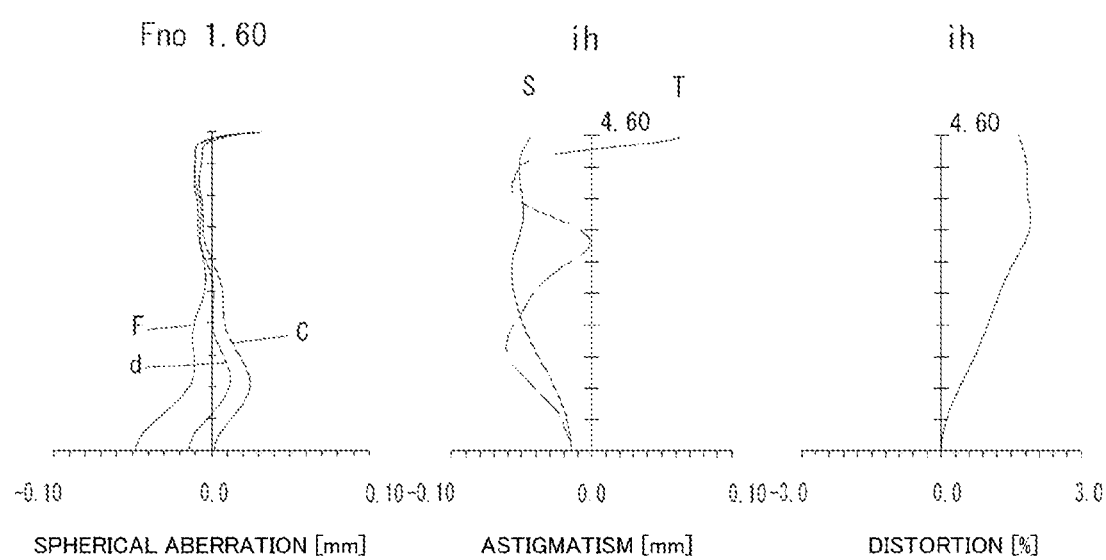
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example4

Unit mm $f = 5.57$
$Fno = 1.60$
$\omega(°) = 39.0$
$ih = 4.60$
$TTL = 6.64$

Surface Data

| i | r | d | Nd | vd |
|---|---|---|---|---|
| (Object) | Infinity | Infinity | | |
| 1(Stop) | Infinity | −0.6470 | | |
| 2* | 2.2837 | 0.9068 | 1.544 | 55.88 (vd1) |
| 3* | 2.1080 | 0.1103 | | |
| 4* | 3.7117 | 0.3000 | 1.671 | 19.48 (vd2) |
| 5* | 2.7758 | 0.4805 | | |
| 6* | 28.4902 | 0.5953 | 1.535 | 55.66 (vd3) |
| 7* | −21.5193 | 0.1681 | | |
| 8* | Infinity | 0.3573 | 1.671 | 19.48 (vd4) |
| 9* | Infinity | 0.5516 | | |
| 10* | −11.9771 | 0.4501 | 1.671 | 19.48 (vd5) |
| 11* | −16.5014 | 0.0150 | | |
| 12* | 3.0988 | 0.5072 | 1.544 | 55.86 (vd6) |
| 13* | 5.5029 | 0.4272 | | |
| 14* | 3.4841 | 0.6000 | 1.535 | 55.66 (vd7) |
| 15* | 1.6899 | 0.5756 | | |
| 18 | Infinity | 0.2100 | 1.517 | 64.20 |
| 19 | Infinity | 0.4542 | | |
| Image Plane | | | | |

Constituent Lens Data

| Lens | Start Surface | Focal Length | Composite Focal Length | | Entrance pupil diameter | |
|---|---|---|---|---|---|---|
| 1 | 2 | 5.798 | f34 | 23.019 | EPd | 3.479 |
| 2 | 4 | −18.821 | | | | |
| 3 | 6 | 23.019 | | | | |
| 4 | 8 | Infinity | | | | |
| 5 | 10 | −67.775 | | | | |
| 6 | 12 | 12.129 | | | | |
| 7 | 14 | −6.777 | | | | |

Aspheric Surface Data

| | Second Surface | Third Surface | Fourth Surface | Fifth Surface | Sixth Surface | Seventh Surface | Eighth Surface |
|---|---|---|---|---|---|---|---|
| k | 0.000000E+00 | 0.000000E+00 | 0.000000E+00 | 0.000000E+00 | 0.000000E+00 | 0.000000E+00 | −1.000000E+00 |
| A4 | −9.595411E−03 | −5.048964E−02 | −9.057730E−02 | −3.195837E−02 | 1.861620E−02 | −6.510127E−02 | −7.736654E−02 |
| A6 | 3.878134E−02 | 2.426110E−02 | 6.097045E−02 | −6.784965E−02 | −2.451460E−01 | 1.005281E−01 | 8.642745E−02 |
| A8 | −8.429360E−02 | 2.167883E−02 | −2.847487E−02 | 3.179149E−01 | 7.971288E−01 | −2.439933E−01 | −1.685876E−01 |
| A10 | 1.081452E−01 | −4.871503E−02 | 3.320617E−02 | −8.295689E−01 | −1.575781E+00 | 3.670115E−01 | 2.229149E−01 |
| A12 | −8.640736E−02 | 3.998487E−02 | −5.065931E−02 | 7.757618E−01 | 1.941123E+00 | −3.420808E−01 | −1.732591E−01 |

TABLE 4-continued

| | | | Example4 | | | | |
|---|---|---|---|---|---|---|---|
| A14 | 4.334337E−02 | −1.799521E−02 | 4.501375E−02 | −6.135966E−01 | −1.509679E+00 | 1.981853E−01 | 8.122106E−02 |
| A16 | −1.329251E−02 | 4.481269E−03 | −2.197077E−02 | 3.027824E−01 | 7.204544E−01 | −6.978192E−02 | −2.281608E−02 |
| A18 | 2.280615E−03 | −5.435228E−04 | 5.609886E−03 | −8.482898E−02 | −1.928556E−01 | 1.371168E−02 | 3.451035E−03 |
| A20 | −1.681618E−04 | 2.017935E−05 | −5.885296E−04 | 1.032983E−02 | 2.223389E−02 | −1.151018E−03 | −2.229469E−04 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k | −1.000000E+00 | 0.000000E+00 | 0.000000E+00 | −6.360830E−01 | 0.000000E+00 | −1.370000E+01 | −5.779678E+00 |
| A4 | −4.950312E−02 | 1.811107E−02 | 5.442346E−03 | 3.523355E−02 | 7.530750E−02 | −1.056544E−01 | −6.716590E−02 |
| A6 | 5.125329E−02 | 5.100828E−02 | 3.152321E−02 | −6.547572E−02 | −7.455170E−02 | 3.507175E−02 | 2.191518E−02 |
| A8 | −9.031099E−02 | −6.901567E−02 | −3.141698E−02 | 2.966634E−02 | 2.935725E−02 | −9.451764E−03 | −6.070389E−03 |
| A10 | 9.637748E−02 | 3.882039E−02 | 1.374358E−02 | −8.466064E−03 | −7.342423E−03 | 2.042883E−03 | 1.324812E−03 |
| A12 | −5.999352E−02 | −1.232603E−02 | −3.497059E−03 | 1.510065E−03 | 1.178265E−03 | −3.044359E−04 | −2.055463E−04 |
| A14 | 2.271109E−02 | 2.067047E−03 | 5.152424E−04 | −1.608176E−04 | −1.166163E−04 | 2.977768E−05 | 2.111140E−05 |
| A16 | −5.159346E−03 | −1.019159E−04 | −3.807930E−05 | 9.809538E−06 | 6.747190E−06 | −1.848032E−06 | −1.352929E−06 |
| A18 | 6.508312E−04 | −1.957125E−05 | 6.019542E−07 | −3.140574E−07 | −2.049796E−07 | 6.662421E−08 | 4.888957E−08 |
| A20 | −3.534829E−05 | 2.463874E−06 | 5.508754E−08 | 4.109735E−09 | 2.453352E−09 | −1.068021E−09 | −7.593528E−10 |

The imaging lens in Example 4 satisfies conditional expressions (1) to (19) as shown in Table 7.

Figure 8:
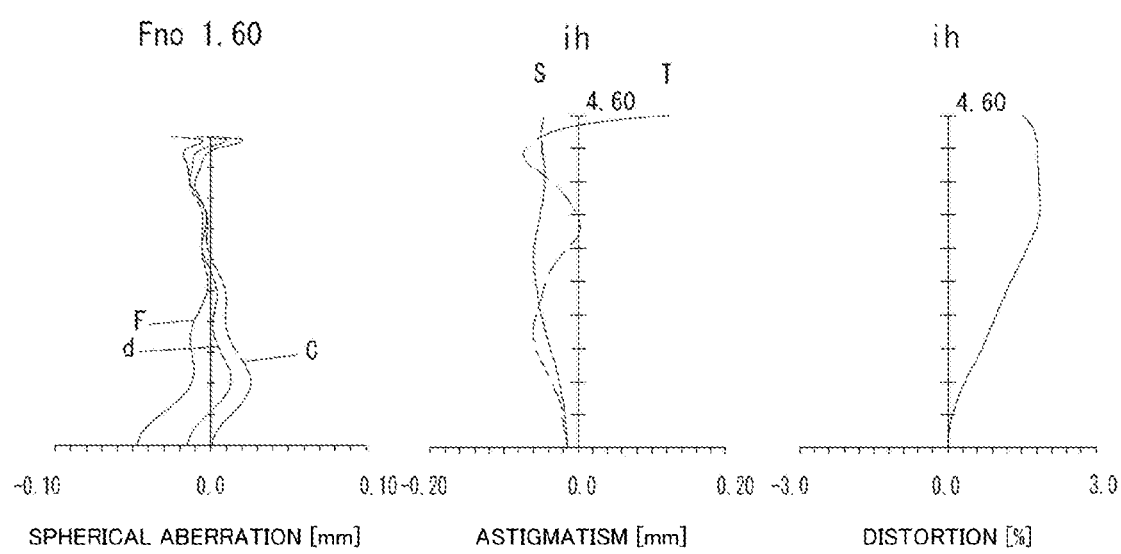
FIG. 8 shows spherical aberration, astigmatism, and distortion of the imaging lens in Example 4 according to the present invention.
Figure 9:
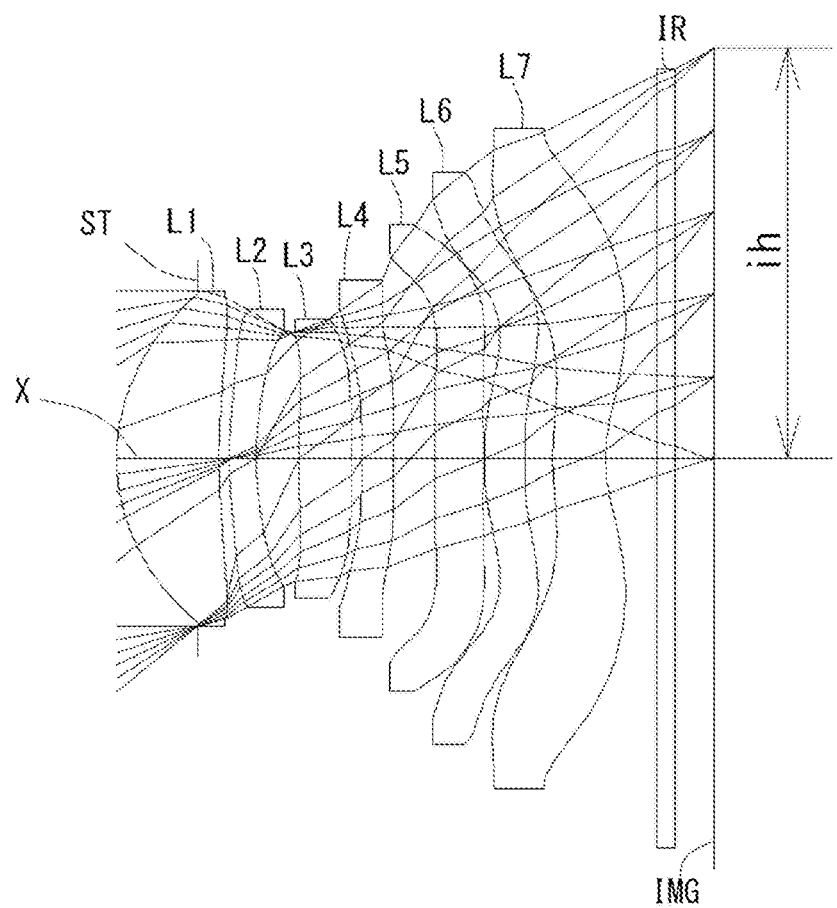
FIG. 9 is a schematic view showing an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example5

Unit mm f = 5.51
Fno = 1.40
ω(°) = 38.8
ih = 4.60
TTL = 6.84

Surface Data

| i | r | d | Nd | vd |
|---|---|---|---|---|
| (Object) | Infinity | Infinity | | |
| 1(Stop) | Infinity | −0.9051 | | |
| 2* | 2.2624 | 1.1514 | 1.544 | 55.86 (vd1) |
| 3* | 5.8864 | 0.1157 | | |
| 4* | 4.0551 | 0.3000 | 1.671 | 19.48 (vd2) |
| 5* | 3.3277 | 0.4829 | | |
| 6* | 14.4417 | 0.5860 | 1.535 | 55.68 (vd3) |
| 7* | 35.9261 | 0.1168 | | |
| 8* | Infinity | 0.3705 | 1.671 | 19.48 (vd4) |
| 9* | Infinity | 0.4558 | | |
| 10* | 146.4907 | 0.5427 | 1.671 | 19.48 (vd5) |
| 11* | −28.1443 | 0.0167 | | |
| 12* | 4.4310 | 0.4500 | 1.544 | 55.86 (vd6) |
| 13* | 6.3517 | 0.3142 | | |
| 14* | 3.3155 | 0.6000 | 1.535 | 55.66 (vd7) |
| 15* | 1.7171 | 0.5756 | | |
| 18 | Infinity | 0.2100 | 1.517 | 54.20 |
| 19 | Infinity | 0.4239 | | |
| Image Plane | | | | |

Constituent Lens Data

| Lens | Start Surface | Focal Length | Composite Focal Length | Entrance pupil diameter |
|---|---|---|---|---|
| 1 | 2 | 6.071 | f34 44.730 | EPd 3.938 |
| 2 | 4 | −33.116 | | |
| 3 | 6 | 44.730 | | |
| 4 | 8 | Infinity | | |
| 5 | 10 | 35.208 | | |

TABLE 5-continued

Example5

| 6 | 12 | 24.867 |
| 7 | 14 | −7.662 |

Aspheric Surface Data

|     | Second Surface | Third Surface | Fourth Surface | Fifth Surface | Sixth Surface | Seventh Surface | Eighth Surface |
| --- | --- | --- | --- | --- | --- | --- | --- |
| k   | 0.000000E+00 | 0.000000E+00 | 0.000000E+00 | 0.000000E+00 | 0.000000E+00 | 0.000000E+00 | −1.000000E+00 |
| A4  | −7.045140E−03 | −6.878454E−02 | −9.875737E−02 | −3.683637E−02 | 3.468651E−03 | −1.371593E−01 | −1.750879E−01 |
| A6  | 1.580973E−02 | 6.669955E−02 | 4.353359E−02 | −7.655933E−02 | −1.238019E−01 | 3.425119E−01 | 4.005952E−01 |
| A8  | −1.919315E−02 | −6.313206E−02 | 1.889326E−02 | 3.345272E−01 | 3.594223E−01 | −6.490333E−01 | −7.698873E−01 |
| A10 | 1.354404E−02 | 5.264601E−02 | −4.483493E−02 | −6.258139E−01 | −6.316843E−01 | 7.222054E−01 | 9.251006E−01 |
| A12 | −5.523500E−03 | −3.254229E−02 | 3.625737E−02 | 7.174857E−01 | 6.831755E−01 | −4.815571E−01 | −6.921969E−01 |
| A14 | 1.166328E−03 | 1.351392E−02 | −1.700714E−02 | −5.187287E−01 | −4.637099E−01 | 1.867817E−01 | 3.251018E−01 |
| A16 | −6.863614E−05 | −3.501623E−03 | 4.782678E−03 | 2.303429E−01 | 1.920382E−01 | −3.797934E−02 | −9.321094E−02 |
| A18 | −1.811191E−05 | 5.119154E−04 | −7.358422E−04 | −5.739409E−02 | −4.439512E−02 | 2.795138E−03 | 1.493275E−02 |
| A20 | 1.923693E−06 | −3.219727E−05 | 4.743665E−05 | 6.166116E−03 | 4.412688E−03 | 9.429185E−05 | −0.028848E−03 |

|     | Ninth Surface | Tenth Surface | Eleventh Surface | Twelfth Surface | Thirteenth Surface | Fourteenth Surface | Fifteenth Surface |
| --- | --- | --- | --- | --- | --- | --- | --- |
| k   | −1.000000E+00 | 0.000000E+00 | −1.991514E+01 | 2.502227E−01 | 0.000000E+00 | −9.700000E+00 | −5.774181E+00 |
| A4  | −8.559829E−02 | −7.712794E−03 | 4.558360E−02 | 1.097243E−01 | 8.211276E−02 | −1.259589E−01 | −7.797851E−02 |
| A6  | 1.267923E−01 | 7.298443E−02 | −3.366737E−02 | 1.032339E−01 | −8.991723E−02 | 5.333300E−02 | 3.119047E−02 |
| A8  | −1.919153E−01 | −9.555729E−02 | 2.177120E−02 | 1.000032E−01 | 4.066657E−02 | −1.685013E−02 | −9.599210E−03 |
| A10 | 1.821441E−01 | 6.191074E−02 | −1.323166E−02 | −3.921720E−02 | −1.182529E−02 | 3.589081E−03 | 2.059873E−03 |
| A12 | −1.053417E−01 | −2.524223E−02 | 5.207883E−03 | 9.697980E−03 | 2.180734E−03 | −4.837101E−04 | −2.982715E−04 |
| A14 | 3.793580E−02 | 6.718386E−03 | −1.255490E−03 | −1.483901E−03 | −2.457126E−04 | 4.085274E−05 | 2.836149E−05 |
| A16 | −8.278467E−03 | −1.139028E−03 | 1.809643E−04 | 1.364542E−04 | 1.616381E−05 | −2.108998E−06 | −1.692659E−06 |
| A18 | 9.970694E−04 | 1.113452E−04 | −1.438255E−05 | −6.926931E−06 | −5.605832E−07 | 6.124159E−08 | 5.743902E−08 |
| A20 | −5.070235E−05 | −4.727607E−06 | 4.855839E−07 | 1.494697E−07 | 7.669125E−09 | −7.723804E−10 | −8.437552E−10 |

The imaging lens in Example 5 satisfies conditional expressions (1) to (19) as shown in Table 7.

Figure 10:
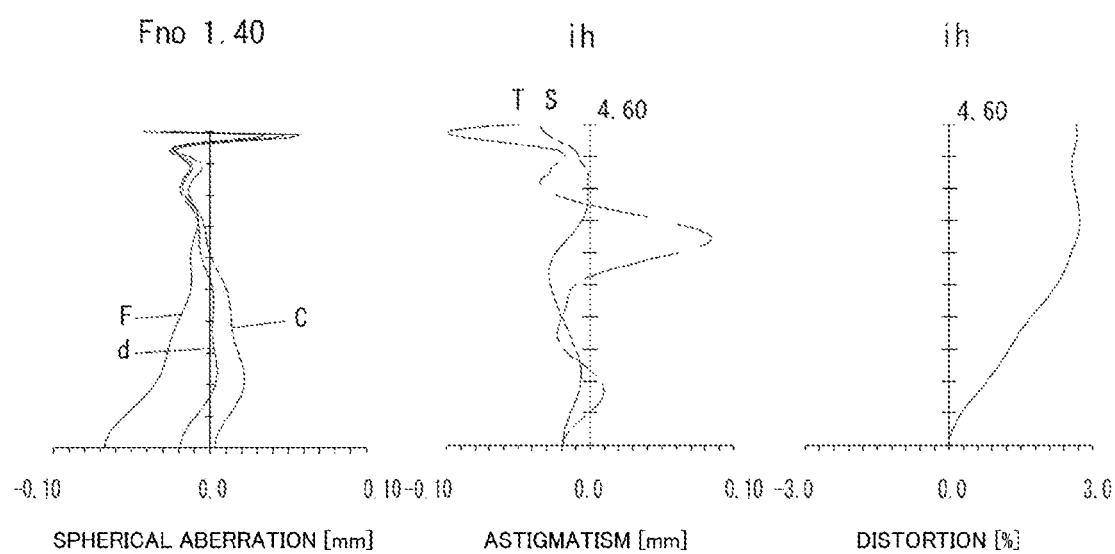
FIG. 10 shows spherical aberration, astigmatism, and distortion of the imaging lens in Example 5 according to the present invention.
Figure 11:
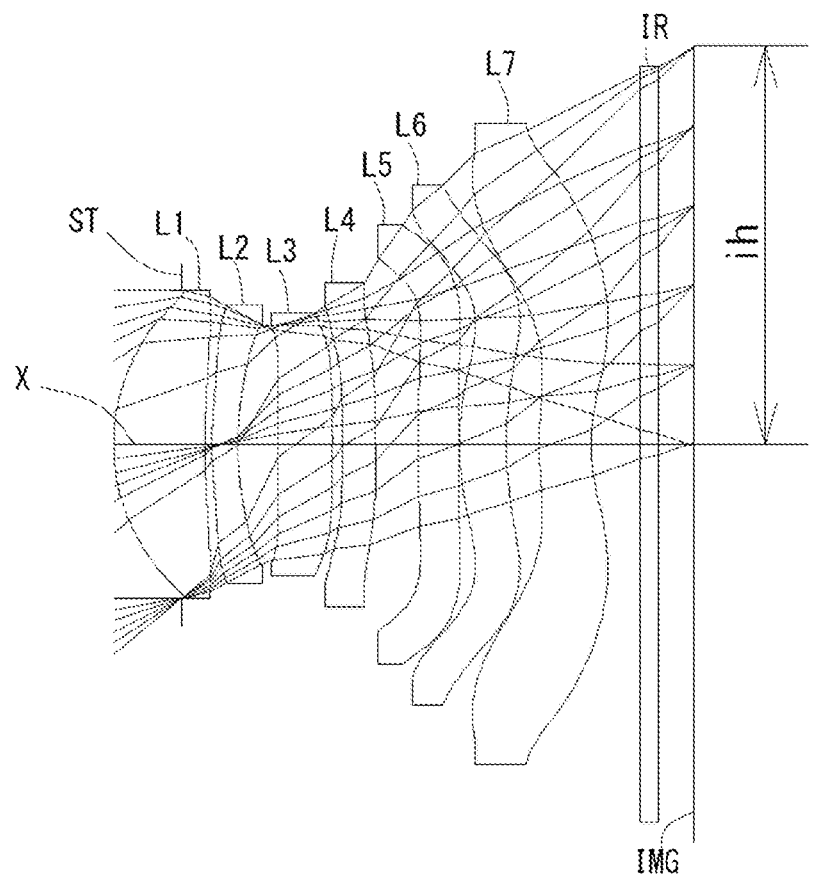
FIG. 11 is a schematic view showing an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example6

Unit mm f = 5.57
Fno = 1.50
ω(°) = 39.0
ih = 4.60
TTL = 6.64

Surface Data

| i | r | d | Nd | vd |
| --- | --- | --- | --- | --- |
| (Object) | Infinity | Infinity | | |
| 1(Stop) | Infinity | −0.7934 | | |
| 2* | 2.2498 | 1.0551 | 1.544 | 55.86 (vd1) |
| 3* | 6.4499 | 0.0808 | | |
| 4* | 4.3121 | 0.3000 | 1.671 | 19.48 (vd2) |
| 5* | 3.4440 | 0.4635 | | |
| 6* | 21.2163 | 0.6346 | 1.535 | 55.66 (vd3) |
| 7* | 62.1994 | 0.1148 | | |
| 8* | Infinity | 0.3800 | 1.671 | 19.48 (vd4) |
| 9* | Infinity | 0.5002 | | |
| 10* | 351.0886 | 0.4586 | 1.671 | 19.48 (vd5) |
| 11* | −31.3190 | 0.0150 | | |
| 12* | 4.3525 | 0.5430 | 1.544 | 65.86 (vd6) |
| 13* | 6.3370 | 0.3740 | | |
| 14* | 3.7291 | 0.6003 | 1.535 | 55.66 (vd7) |
| 15* | 1.7910 | 0.5756 | | |

TABLE 6-continued

Example6

| | | | | | |
|---|---|---|---|---|---|
| 18 | | Infinity | 0.2100 | 1.517 | 64.20 |
| 19 | | Infinity | 0.4052 | | |
| Image Plane | | | | | |

Constituent Lens Data

| Lens | Start Surface | Focal Length | Composite Focal Length | | Entrance pupil diameter | |
|---|---|---|---|---|---|---|
| 1 | 2 | 5.831 | f34 | 59.884 | EPd | 3.714 |
| 2 | 4 | −29.588 | | | | |
| 3 | 6 | 59.884 | | | | |
| 4 | 8 | Infinity | | | | |
| 5 | 10 | 42.849 | | | | |
| 6 | 12 | 23.289 | | | | |
| 7 | 14 | −7.223 | | | | |

Aspheric Surface Data

| | Second Surface | Third Surface | Fourth Surface | Fifth Surface | Sixth Surface | Seventh Surface | Eighth Surface |
|---|---|---|---|---|---|---|---|
| k   | 0.000000E+00  | 0.000000E+00  | 0.000000E+00  | 0.000000E+00  | 0.000000E+00  | 0.000000E+00  | −1.000000E+00 |
| A4  | −6.191261E−03 | −7.743333E−02 | −1.074340E−01 | −1.851354E−02 | 9.314289E−03  | −1.068921E−01 | −1.286190E−01 |
| A6  | 2.179802E−02  | 7.844181E−02  | 7.949356E−02  | −1.425778E−01 | −1.612565E−01 | 2.546644E−01  | 2.469708E−01  |
| A8  | −3.624435E−02 | −6.452503E−02 | −3.494137E−02 | 5.332276E−01  | 4.706754E−01  | −5.190534E−01 | −4.674910E−01 |
| A10 | 3.480568E−02  | 4.907069E−02  | 1.382178E−02  | −1.003893E+00 | −8.473242E−01 | 6.351718E−01  | 5.716783E−01  |
| A12 | −1.973996E−02 | −3.253499E−02 | −1.200113E−02 | 1.169949E+00  | 9.484351E−01  | −4.797114E−01 | −4.383049E−01 |
| A14 | 6.520815E−03  | 1.579327E−02  | 1.026891E−02  | −8.635178E−01 | −8.712949E−01 | 2.201743E−01  | 2.111154E−01  |
| A16 | −1.158161E−03 | −4.958314E−03 | −4.882393E−03 | 3.926748E−01  | 2.918252E−01  | −5.827747E−02 | −6.193413E−02 |
| A18 | 8.583353E−05  | 8.833169E−04  | 1.181612E−03  | −1.003948E−01 | −7.116327E−02 | 7.845120E−03  | 1.013186E−02  |
| A20 | −6.275746E−07 | −6.737249E−05 | −1.138530E−04 | 1.106889E−02  | 7.477783E−03  | −3.779519E−04 | −7.149110E−04 |

| | Ninth Surface | Tenth Surface | Eleventh Surface | Twelfth Surface | Thirteenth Surface | Fourteenth Surface | Fifteenth Surface |
|---|---|---|---|---|---|---|---|
| k   | −1.000000E+00 | 0.000000E+00  | −2.396511E+01 | −4.354261E−02 | 0.000000E+00  | −1.375000E+01 | −5.976612E+00 |
| A4  | −7.923742E−02 | −1.391656E−02 | 4.767572E−02  | 1.073928E−01  | 7.159290E−02  | −1.094065E−01 | −7.389445E−02 |
| A6  | 1.168646E−01  | 8.542337E−02  | −2.316436E−02 | −1.567289E−01 | −7.159825E−02 | 3.994294E−02  | 2.796487E−02  |
| A8  | −1.828322E−01 | −1.043287E−01 | 6.101339E−03  | 9.883734E−02  | 2.758383E−02  | −1.393856E−02 | −9.753968E−03 |
| A10 | 1.824198E−01  | 6.387794E−02  | −4.148750E−03 | −4.224601E−02 | −6.784979E−03 | 3.693571E−03  | 2.497550E−03  |
| A12 | −1.118280E−01 | −2.422575E−02 | 2.496111E−03  | 1.191320E−02  | 9.961164E−04  | −6.210995E−04 | −4.159062E−04 |
| A14 | 4.289138E−02  | 5.908266E−03  | −8.195658E−04 | −2.148317E−03 | −7.057379E−05 | 6.470041E−05  | 4.342979E−05  |
| A16 | −9.998125E−03 | −9.127438E−04 | 1.471886E−04  | 2.377587E−04  | 1.953010E−07  | −4.083218E−06 | −2.746252E−06 |
| A18 | 1.289309E−03  | 8.096391E−05  | −1.384374E−05 | −1.467551E−05 | 2.613763E−07  | 1.438563E−07  | 9.626989E−08  |
| A20 | −7.048303E−05 | −3.061280E−06 | 5.368492E−07  | 3.859752E−07  | −1.058867E−08 | −2.182080E−09 | −1.436668E−09 |

The imaging lens in Example 6 satisfies conditional expressions (1) to (19) as shown in Table 7.

Figure 12:
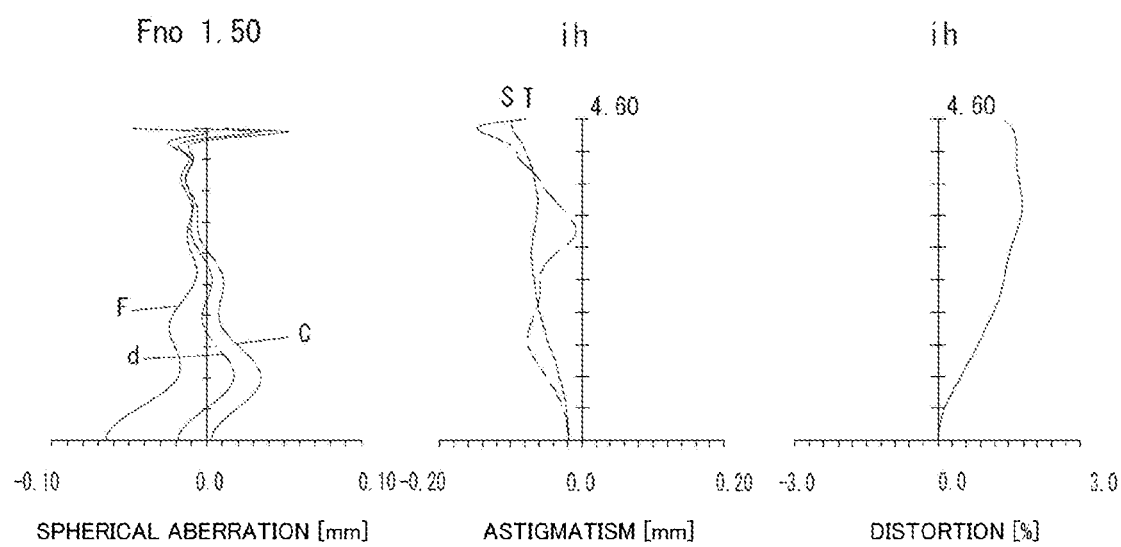
FIG. 12 shows spherical aberration, astigmatism, and distortion of the imaging lens in Example 6 according to the present invention.

FIG. 12 shows spherical aberration (mm), astigmatism (mm), and distortion (%) of the imaging lens in Example 6.

As shown in FIG. 12, each aberration is corrected excellently.

In table 7, values of conditional expressions (1) to (19) related to the Examples 1 to 6 are shown.

TABLE 7

| | Conditional expression | Example1 | Example2 | Example3 | Example4 | Example5 | Example6 |
|---|---|---|---|---|---|---|---|
| (1) | vd2 | 19.48 | 19.48 | 19.48 | 19.48 | 19.48 | 19.48 |
| (2) | vd3/vd6 | 2.86 | 2.86 | 2.86 | 2.86 | 2.86 | 2.86 |
| (3) | (T5/TTL) × 100 | 0.23 | 0.23 | 0.23 | 0.23 | 0.25 | 0.23 |
| (4) | vd4 | 55.86 | 19.48 | 19.48 | 19.48 | 19.48 | 19.48 |
| (5) | vd2/vd5 | 1.00 | 1.00 | 1.00 | 1.00 | 1.00 | 1.00 |
| (6) | vd3/vd6 | 1.00 | 1.00 | 1.00 | 1.00 | 1.00 | 1.00 |
| (7) | (D2/f2) × 100 | −1.83 | −1.57 | −1.48 | −1.59 | −0.91 | −1.01 |
| (8) | (D5/|f5|) × 100 | 4.36 | 3.82 | 0.55 | 0.86 | 1.54 | 1.07 |
| (9) | (T3/TTL) × 100 | 2.94 | 2.76 | 2.24 | 2.53 | 1.78 | 1.73 |
| (10) | |f3/f5| | 1.37 | 1.29 | 0.27 | 0.34 | 1.27 | 1.40 |
| (11) | |f3/f7| | 3.04 | 3.15 | 3.38 | 3.40 | 5.84 | 8.29 |
| (12) | r2/f | 1.40 | 1.34 | 1.24 | 1.28 | 1.07 | 1.16 |
| (13) | r10/f | −1.04 | −1.05 | −2.36 | −2.96 | −5.10 | −5.62 |
| (14) | r13/f | 0.99 | 1.02 | 0.65 | 0.63 | 0.60 | 0.67 |
| (15) | r5/f | 1.65 | 1.88 | 4.88 | 5.12 | 2.62 | 3.81 |
| (16) | r14/f | 0.36 | 0.36 | 0.30 | 0.30 | 0.31 | 0.32 |
| (17) | f34/f | 3.45 | 3.49 | 3.90 | 4.14 | 8.11 | 10.75 |

TABLE 7-continued

| Conditional expression | Example1 | Example2 | Example3 | Example4 | Example5 | Example6 |
|---|---|---|---|---|---|---|
| (18) (D3/f3) × 100 | 2.57 | 2.54 | 2.75 | 2.59 | 1.31 | 1.06 |
| (19) TTL/EPd | 1.78 | 1.78 | 1.90 | 1.91 | 1.69 | 1.79 |

When the imaging lens according to the present invention is adopted to a product with the camera function, there is realized contribution to the wide field of view, the low-profileness and the low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
L7: seventh lens
ih: maximum image height
IR: filter
IMG: imaging plane

What is claimed is:

1. An imaging lens comprising in order from an object side to an image side,
a first lens with positive refractive power having an object-side surface being convex in a paraxial region,
a second lens with negative refractive power in a paraxial region,
a third lens,
a fourth lens being a double-sided aspheric lens,
a fifth lens,
a sixth lens having an image-side surface being concave in a paraxial region, and
a seventh lens with negative refractive power having an image-side surface being concave in a paraxial region, wherein the image-side surface of said seventh lens is an aspheric surface having at least one pole point in a position off the optical axis, and following conditional expressions (1), (2) and (3) are satisfied:

$$10.00 < vd2 < 29.00 \quad (1)$$

$$1.80 < vd3/vd5 < 4.00 \quad (2)$$

$$0.10 < (T5/TTL) \times 100 < 0.40 \quad (3)$$

where
vd2: an abbe number at d-ray of the second lens,
vd3: an abbe number at d-ray of the third lens,
vd5: an abbe number at d-ray of the fifth lens,
T5: a distance along the optical axis from an image-side surface of the fifth lens to an object-side surface of the sixth lens, and
TTL: a total track length.

2. The imaging lens according to claim 1, wherein an object-side surface of said third lens is convex in a paraxial region.

3. The imaging lens according to claim 1, wherein an object-side surface of said seventh lens is convex in a paraxial region.

4. The imaging lens according to claim 1, wherein an object-side surface and an image-side surface of said fourth lens are plane surfaces in a paraxial region.

5. The imaging lens according to claim 1, wherein the following conditional expression (6) is satisfied:

$$0.60 < vd3/vd6 < 1.40 \quad (6)$$

where
vd3: an abbe number at d-ray of the third lens, and
vd6: an abbe number at d-ray of the sixth lens.

6. The imaging lens according to claim 1, wherein the following conditional expression (8) is satisfied:

$$0.30 < (D5/|f5|) \times 100 < 6.50 \quad (8)$$

where
D5: a thickness along the optical axis of the fifth lens, and
f5: a focal length of the fifth lens.

7. The imaging lens according to claim 1, wherein the following conditional expression (10) is satisfied:

$$0.10 < |f3/f5| < 2.10 \quad (10)$$

where
f3: a focal length of the third lens, and
f5: a focal length of the fifth lens.

8. The imaging lens according to claim 1, wherein the following conditional expression (12) is satisfied:

$$0.50 < r2/f < 2.10 \quad (12)$$

where
r2: a paraxial curvature radius of an image-side surface of the first lens, and
f: a focal length of the overall optical system of the imaging lens.

9. The imaging lens according to claim 1, wherein the following conditional expression (13) is satisfied:

$$-8.50 < r10/f < -0.70 \quad (13)$$

where
r10: a paraxial curvature radius of an image-side surface of the fifth lens, and
f: a focal length of the overall optical system of the imaging lens.

10. The imaging lens according to claim 1, wherein the following conditional expression (14) is satisfied:

$$0.30 < r13/f < 1.55 \quad (14)$$

where
r13: a paraxial curvature radius of an object-side surface of the seventh lens, and
f: a focal length of the overall optical system of the imaging lens.

* * * * *